(12) United States Patent
Loper et al.

(10) Patent No.: US 11,755,199 B2
(45) Date of Patent: Sep. 12, 2023

(54) LINEAR ON-SCREEN KEYBOARD WITH FLOATING UTILITY KEYS

(71) Applicant: NETFLIX, INC., Los Gatos, CA (US)

(72) Inventors: Emily Loper, San Jose, CA (US); Eric Hsieh, San Francisco, CA (US); Kevin O'Connor, Santa Cruz, CA (US); Joseph William Lesko, Los Gatos, CA (US); David Aragon, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/287,946

(22) Filed: Feb. 27, 2019

(65) Prior Publication Data
US 2020/0183581 A1 Jun. 11, 2020

Related U.S. Application Data

(60) Provisional application No. 62/775,769, filed on Dec. 5, 2018.

(51) Int. Cl.
*G06F 3/04886* (2022.01)
*G06F 3/0482* (2013.01)

(52) U.S. Cl.
CPC ........ *G06F 3/04886* (2013.01); *G06F 3/0482* (2013.01)

(58) Field of Classification Search
CPC .................................. G06F 3/14; G06F 3/04
USPC ......... 715/773, 768; 345/156, 172; 713/182; 707/722; 340/146.2, 10.5
See application file for complete search history.

(56) References Cited

U.S. PATENT DOCUMENTS

| | | | |
|---|---|---|---|
| 5,410,719 A * | 4/1995 | Shackleford | G06F 7/76 340/146.2 |
| 9,681,183 B1 * | 6/2017 | Majid | H04N 21/4122 |
| 2003/0095095 A1 * | 5/2003 | Pihlaja | H04M 1/03 345/156 |
| 2007/0016792 A1 * | 1/2007 | Allen | G06F 3/0489 713/182 |
| 2008/0303793 A1 | 12/2008 | Carroll | |
| 2014/0035824 A1 * | 2/2014 | Bernstein | G06F 3/04886 345/172 |
| 2014/0244622 A1 * | 8/2014 | Lindsay | G06F 40/166 707/722 |
| 2015/0253870 A1 * | 9/2015 | Ikeda | G06F 3/0233 345/158 |
| 2015/0301739 A1 * | 10/2015 | Jain | G06F 3/0482 715/768 |
| 2015/0363615 A1 * | 12/2015 | Boudville | H04W 4/80 340/10.5 |
| 2017/0123598 A1 * | 5/2017 | Phan | G06F 3/04842 |
| 2017/0168711 A1 * | 6/2017 | Temple | G06F 3/04886 |
| 2021/0200393 A1 * | 7/2021 | Wohlstadter | G06F 3/04886 |

* cited by examiner

*Primary Examiner* — Ruay Ho
(74) *Attorney, Agent, or Firm* — Artegis Law Group, LLP

(57) ABSTRACT

A computer-implemented method causing a linear on-screen keyboard that includes an array of input keys and a focus indicator to be displayed, wherein navigation of the focus indicator to an input key in the array enables a selection of a character corresponding to the input key; and upon determining that the focus indicator has navigated to a first input key in the array, causing one or more utility keys to be displayed proximate to the first input key.

18 Claims, 11 Drawing Sheets

LINEAR ON-SCREEN KEYBOARD WITH FLOATING UTILITY KEYS

CROSS-REFERENCE TO RELATED APPLICATIONS

This application claims priority to United States Design Patent Application titled, "DISPLAY SCREEN OR PORTION THEREOF WITH A GRAPHICAL USER INTERFACE," filed on Dec. 5, 2018 and having Ser. No. 29/672,447. This application also claims the priority benefit of the United States Provisional Patent Application titled, "LINEAR ON-SCREEN KEYBOARD WITH FLOATING UTILITY KEYS," filed on Dec. 5, 2018 and having Ser. No. 62/775,769. The subject matter of these related applications is hereby incorporated herein by reference.

BACKGROUND

Field of the Various Embodiments

The present disclosure relates generally to playing streaming video and, more specifically, to a linear on-screen keyboard with floating utility keys.

Description of the Related Art

A remote control device can be used to interact with a software application via a television-based display system. For example, the remote control device can be used to enter alphanumeric inputs and/or select icons displayed by the application. A user of the remote control device provides inputs by navigating across an on-screen keyboard and selecting input keys on the on-screen keyboard via buttons on the remote control device.

On-screen keyboards are often configured as a two-dimensional grid-based display. The user inputs a character by moving a focus indicator vertically and/or horizontally on the display to an input key corresponding to the character and then selecting the input key. This process is time-consuming and can be frustrating for the user. For example, once the user has completed inputting a first alphanumeric character, the next character to be entered can be located in any of several directions from the current location of the focus indicator. Thus, the user must visually search for the location of the next character to be entered, and then move the focus indicator accordingly.

SUMMARY

A computer-implemented method includes causing a linear on-screen keyboard that includes an array of input keys and a focus indicator to be displayed, wherein navigation of the focus indicator to an input key in the array enables a selection of a character corresponding to the input key; and upon determining that the focus indicator has navigated to a first input key in the array, causing one or more utility keys to be displayed proximate to the first input key.

At least one advantage of the disclosed techniques is that a user can more quickly and easily enter alphanumeric inputs via a television-based display system compared to conventional on-screen keyboards. In addition, one or more high-usage utility keys can be accessed with a few button presses, regardless of the current location of the focus indicator along the linear on-screen keyboard.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
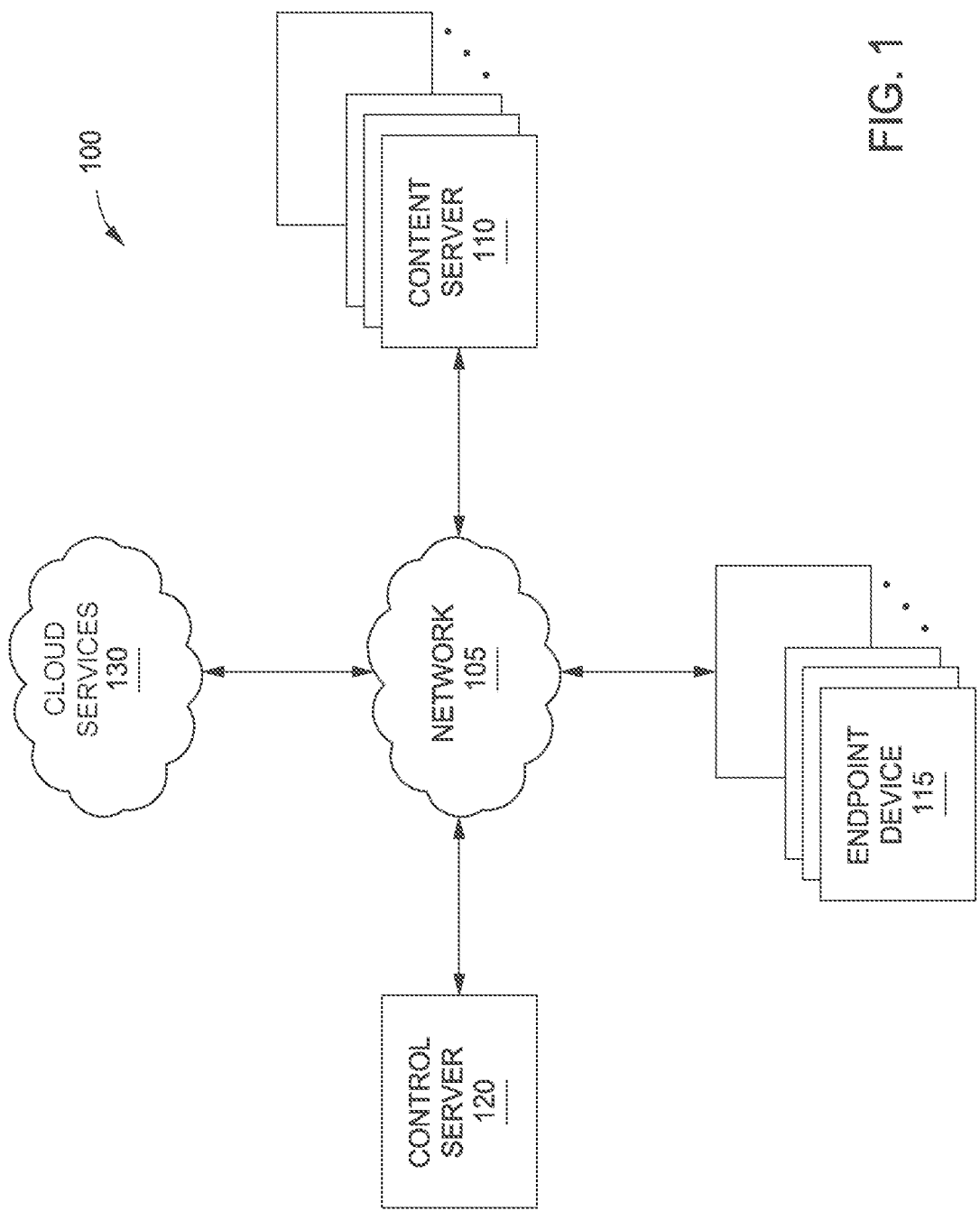
FIG. 1 illustrates a network infrastructure configured to implement one or more aspects of the present disclosure.

In the following description, numerous specific details are set forth to provide a more thorough understanding of the various embodiments. However, it will be apparent to one of skilled in the art that the inventive concepts may be practiced without one or more of these specific details.

Overview

A television remote control device or game console controller can be used as an input device for entering alphanumeric inputs and selecting icons displayed by video-streaming applications. For example, a user generates inputs to a video-streaming application by navigating across an on-screen keyboard and selecting input keys on the on-screen keyboard via buttons on the television remote or game console. On-screen keyboards are often configured as a two-dimensional grid-based display. The user inputs a character by moving a focus indicator vertically and/or horizontally on the display to an input key corresponding to the character and then selecting the input key. While this process is simple to perform, it can be time-consuming and frustrating for the user. The disclosed techniques improve the ease of inputting alphanumeric characters using an on-screen keyboard, thereby decreasing friction in the process of entering search queries via a television-based display system. As a result, a user of the television-based display system can find content faster and with reduced cognitive effort.

In various embodiments, a linear on-screen keyboard is presented to a user that enables the selection of alphanumeric characters via bi-directional navigation. A focus indicator highlights a character being selected on the linear on-screen keyboard. In addition, one or more high-usage utility keys, such as the space input key and/or the backspace input key, are displayed proximate to the current location of the focus indicator for easy access. For example, when the linear on-screen keyboard is displayed as a horizontal set of input keys, the one or more utility keys are displayed, or "float," above or below the focus indicator, and can be brought into focus, i.e., highlighted, with one or two key inputs.

Advantageously, the linear on-screen keyboard prevents the user from being visually disoriented during navigation of the focus indicator, since the relative positions of alphanumeric characters are presented to the user in an intuitive configuration. For example, the letters of the alphabet can be displayed in alphabetical order as a horizontal or vertical array, followed by the numbers 1-9 and 0 arranged in numerical order. Thus, the focus indicator does not repeatedly jump from one side of the on-screen keyboard back to the other during navigation, as is the case with a two-dimensional grid-based on-screen keyboard.

A further advantage is that the linear on-screen keyboard enables high-usage keys to be accessed with a small number of button presses, regardless of the current location of the focus indicator along the linear on-screen keyboard. By contrast, in a conventional grid-based on-screen keyboard, high-usage, non-alphanumeric input keys, such as space and backspace, are typically located at a beginning region or ending region of the on-screen keyboard. As a result, unlike the linear on-screen keyboard, the selection of such high-usage input keys requires navigation of a focus indicator across large portions of the conventional keyboard.

The linear on-screen keyboard, therefore, improves the operation of the device, such as the television system, on which the keyboard is being displayed. In particular, the linear on-screen keyboard enables a user to operate and/or navigate content on the television system in an efficient manner. Through the linear on-screen keyboard, the user is able to enter text more quickly relative to conventional grid-based on-screen keyboards. Therefore, the linear on-screen keyboard makes the operation of the device and/or application executing on the device more effective.

System Overview

FIG. 1 illustrates a network infrastructure 100, according to various embodiments. As shown, the network infrastructure 100 includes content servers 110, control server 120, and endpoint devices 115, each of which are connected via a communications network 105. Network infrastructure 100 is configured to distribute content to content servers 110, and such content is then distributed on demand to endpoint devices 115.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and hand-held video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with cloud services 130 and one or more other content servers 110 in order to "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
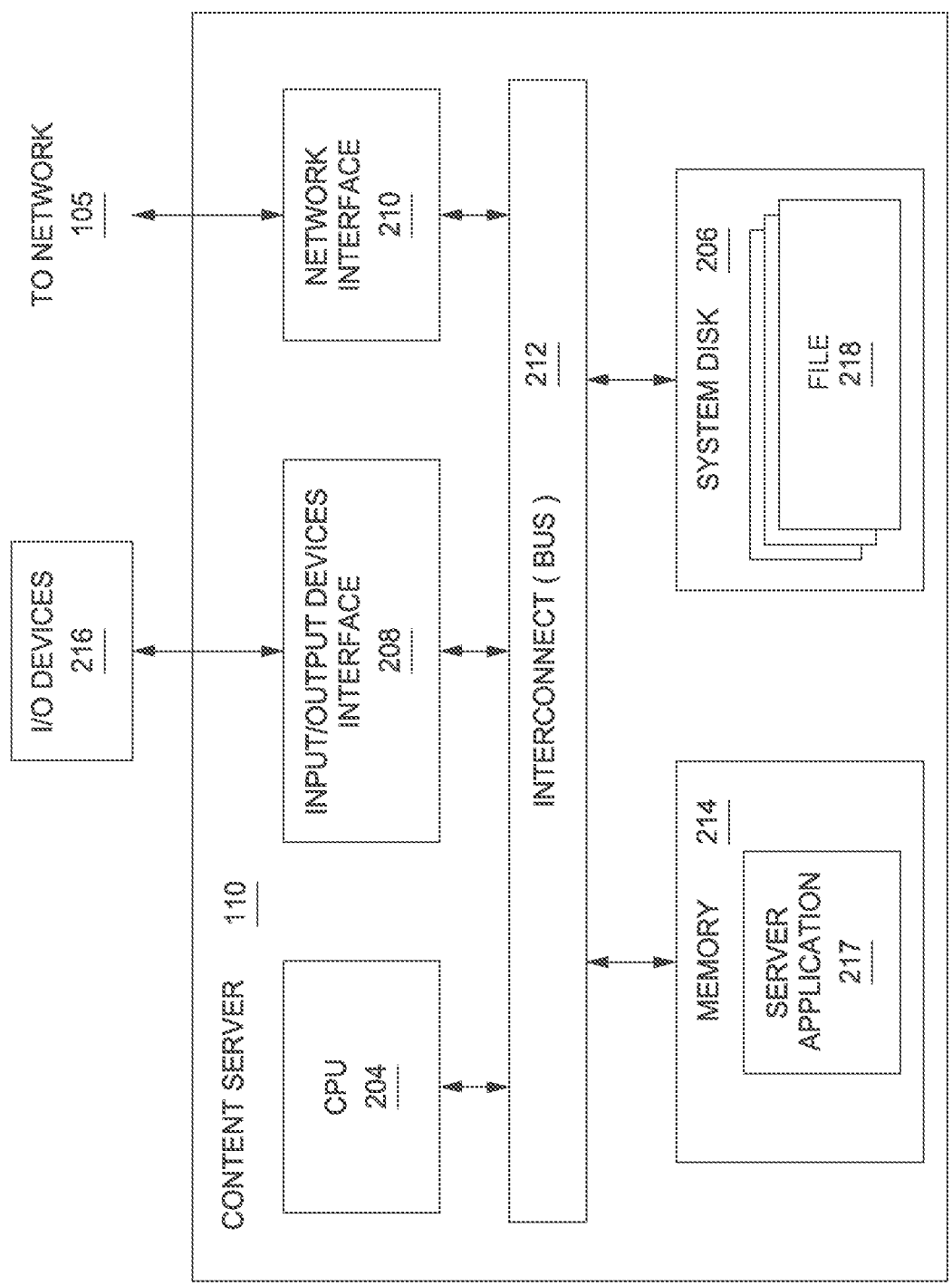
FIG. 2 is a more detailed illustration of the content server of FIG. 1, according to various embodiments.

FIG. 2 is a more detailed illustration of content server 110 of FIG. 1, according to various embodiments. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Files 218 include a plurality of digital visual content items, such as videos and still images. In addition, files 218 may include textual content associated with such digital visual content items, such as movie metadata.

Figure 3:
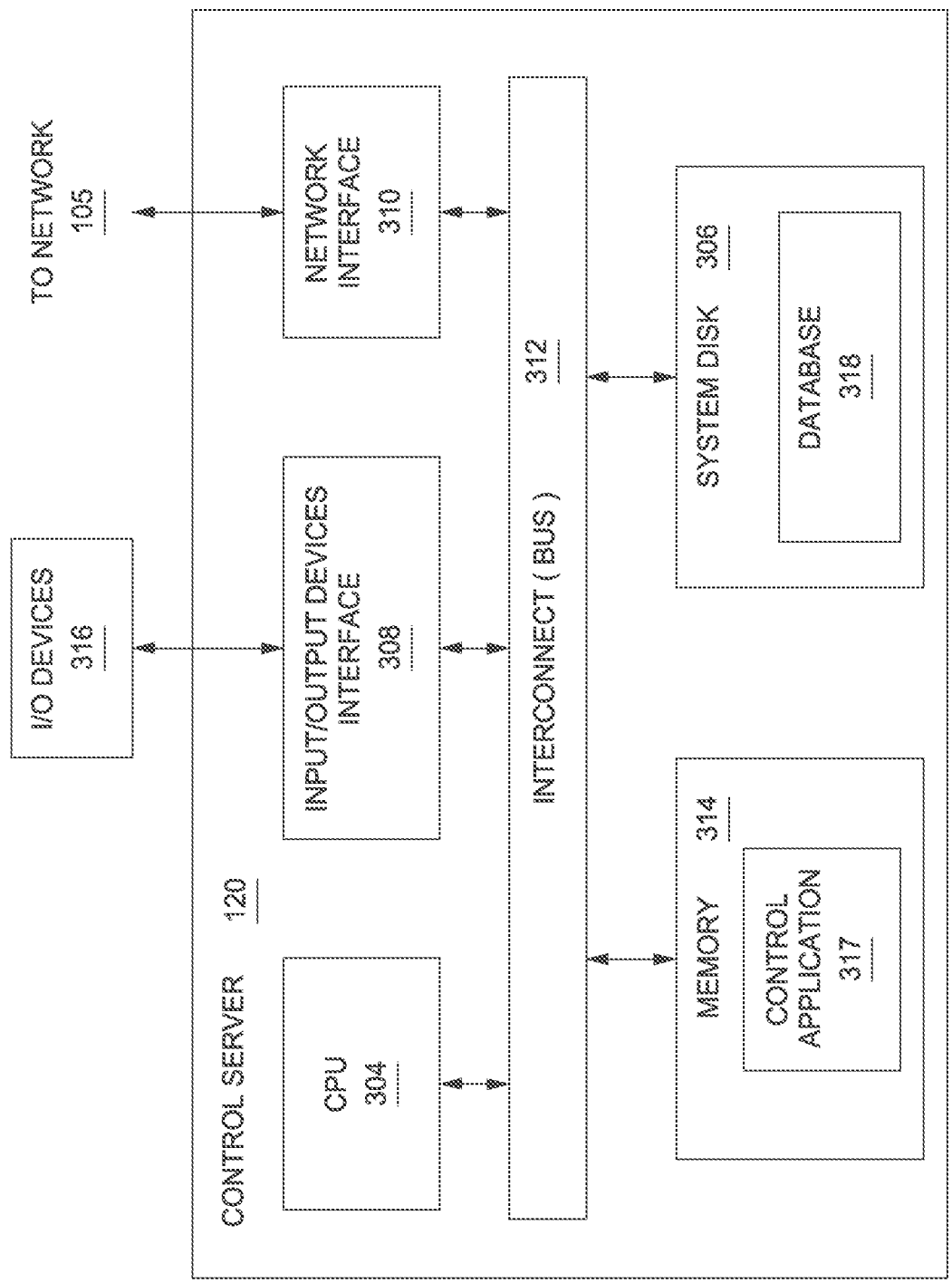
FIG. 3 is a more detailed illustration of the control server of FIG. 1, according to various embodiments.

FIG. 3 is a more detailed illustration of control server 120 of FIG. 1, according to various embodiments. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 (shown in FIG. 2) is configured to store a database 318 of information associated with content servers 110, cloud services 130, and files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115.

Figure 4:
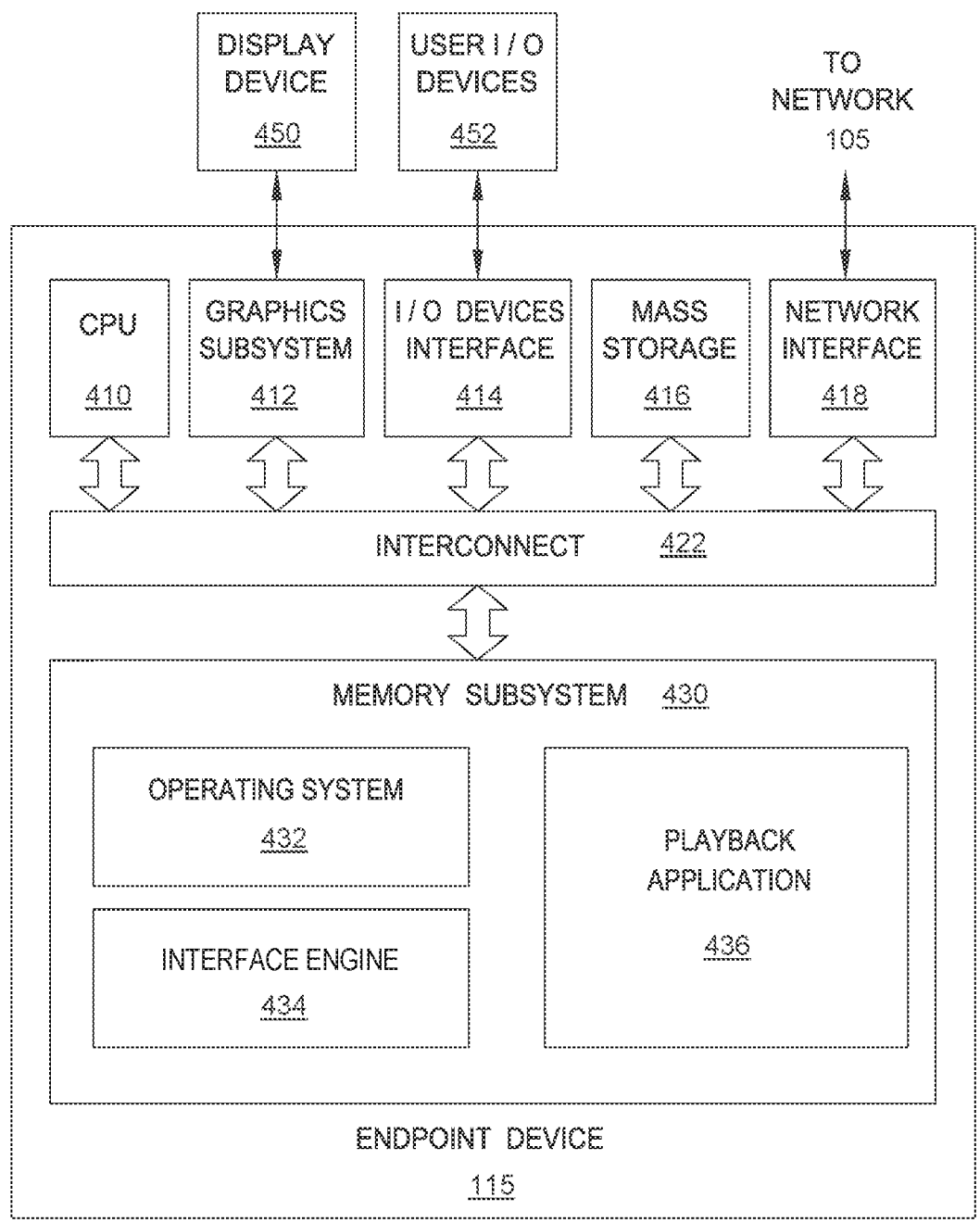
FIG. 4 is a more detailed illustration of the endpoint device of FIG. 1, according to various embodiments.

FIG. 4 is a more detailed illustration of the endpoint device 115 of FIG. 1, according to various embodiments. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 is also configured to generate a graphical user interface (GUI) and transmit the GUI to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray tube technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one or more buttons or other pointing devices, such as the "up," "down," "left," "right," and "select" buttons on a television remote or video game console. The I/O device interface 414 also includes an audio output unit configured to generate an electrical audio output signal. User I/O devices 452 includes an audio speaker configured to generate an acoustic output in response to the electrical audio input signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, an interface engine 434, and a playback application 436. The operating system 432 performs system management functions such as managing hardware devices including the network interface 418, mass storage unit 416, I/O device interface 414, and graphics subsystem 412. The operating system 432 also provides process and memory management models for the interface engine 434 and the playback application 436. The interface engine 434, such as a window and object metaphor, provides a mechanism for user interaction with endpoint device 115, and is configured to generate a GUI as described herein. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

User Interface

Figure 5:
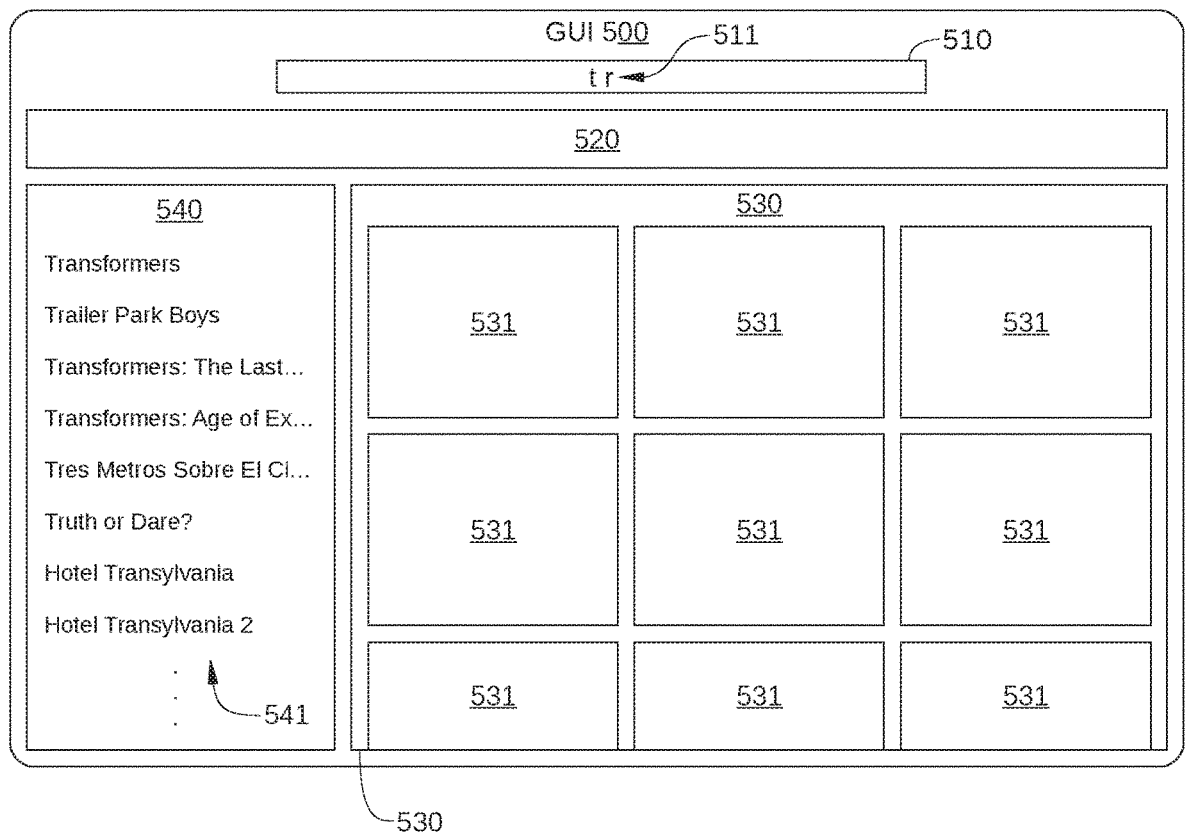
FIG. 5 illustrates a graphical user interface (GUI) generated by the user interface of FIG. 4, according to various embodiments.

FIG. 5 illustrates a GUI 500 generated by interface engine 434 of FIG. 4, according to various embodiments. GUI 500 can be displayed on display device 450 of endpoint device 115. In various embodiments, GUI 500 is displayed when endpoint device 115 is configured as a television-based display system, such as a smart television, a television coupled to a video game console, and the like.

As shown, GUI 500 includes an entered character field 510 and a linear on-screen keyboard 520. Entered character field 510 displays character inputs 511 in response to the entry of corresponding alphanumeric characters (not shown) input by a user via linear on-screen keyboard 520. Linear on-screen keyboard 520 enables a user of endpoint device 115 to input alphanumeric inputs 511 to playback application 436 via interface engine 434. Various embodiments of linear on-screen keyboard 520 are described in greater detail below in conjunction with FIGS. 6A-9.

In some embodiments, GUI 500 further includes an image results display region 530 for displaying icons 531 that correspond to certain search query results. The GUI 500 also includes a text results display region 540 for displaying completed text 541 of search query results. Icons 531 and completed text 541 are displayed in response to alphanumeric inputs 511 received via linear on-screen keyboard 520 and correspond to output determined by the video-streaming application or other software application running on the computing device displaying GUI 500. For example, in some embodiments, alphanumeric inputs 511 are entered via GUI 500 as part of a search process performed by a user, and icons 531 and completed text 541 update as more alphanumeric search inputs are entered by the user. Thus, in such embodiments, as a user continues to enter additional alphanumeric inputs 511 via linear on-screen keyboard 520, icons 531 and completed text 541 may change accordingly.

Linear On-Screen Keyboard

Figure 6A:
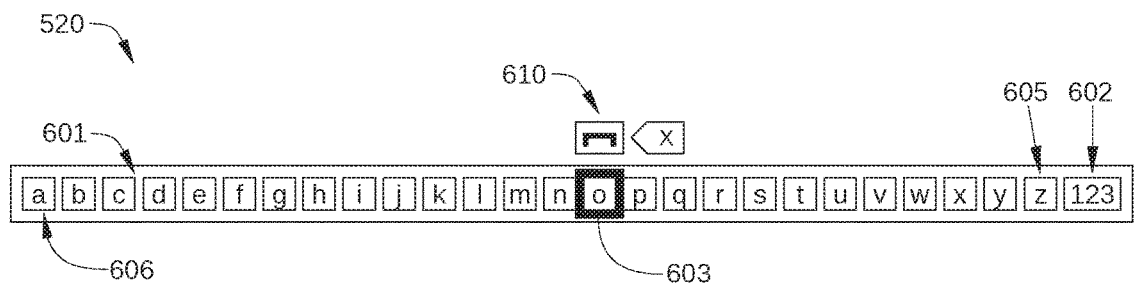
FIGS. 6A-6C are more detailed illustrations of linear on-screen keyboard of FIG. 5, according to various embodiments.
Figure 6B:
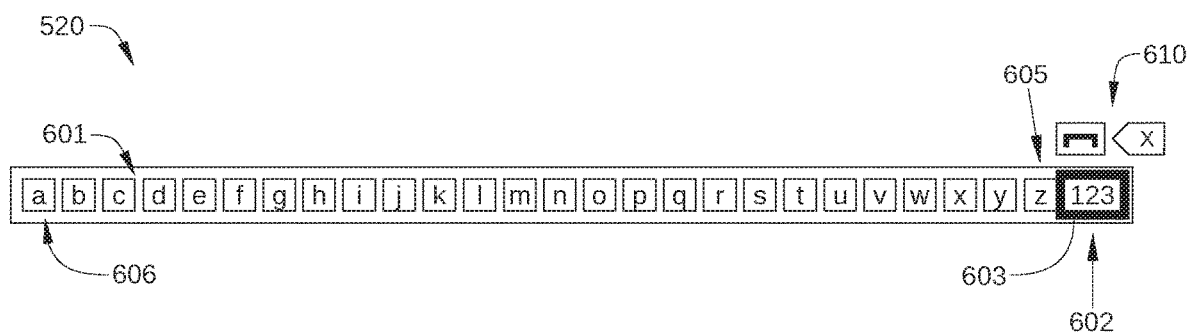
Figure 6C:
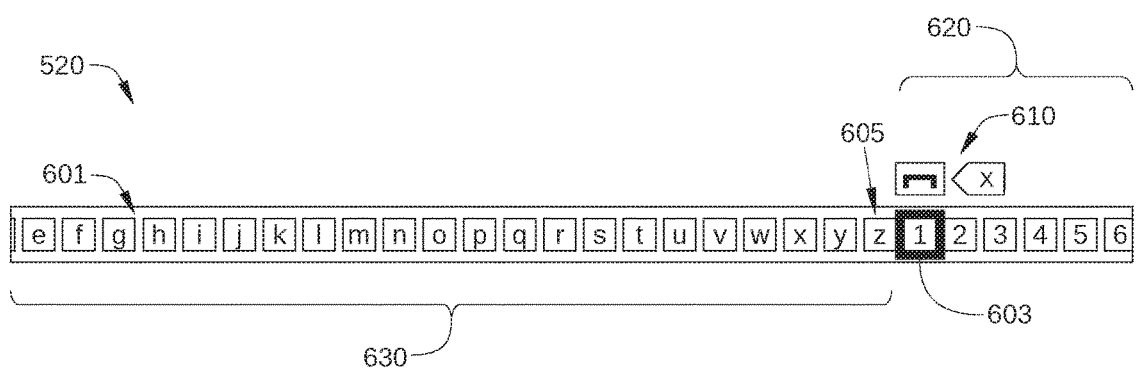

FIGS. 6A-6C are more detailed illustrations of linear on-screen keyboard 520 of FIG. 5, according to various embodiments. As shown, linear on-screen keyboard 520 includes a plurality of input keys 601 that each enables the selection of a different respective alphanumeric character, a focus indicator 603, and one or more floating utility keys 610. Bidirectional navigation of focus indicator 603 in a first direction that is parallel with linear on-screen keyboard 520 (for example, left/right) along linear on-screen keyboard 520 enables selection of input keys 601. By contrast, bidirectional navigation of focus indicator 520 in a second direction that is perpendicular to the first direction (for example, up/down) enables selection of one or more of floating utility keys 610. Alternatively, selection of one or more of floating utility keys 610 is performed by navigation of focus indicator 603 in the second direction followed by navigation of focus indicator 603 in the second direction.

Linear on-screen keyboard 520 enables rapid navigation of focus indicator 603 between different input keys 601, since the relative positions of alphanumeric characters are presented to the user in an intuitive configuration. By contrast, with a conventional grid-based on-screen keyboard, the relative position of the letters and numbers in a two-dimensional grid are not arranged in an intuitive configuration that corresponds to a user's understanding of the language. For example, in one example of a two-dimensional grid, the letter m can be adjacent to the letters "g," "n," and "s," but not the letter "l". Similarly, the letter "x" can be adjacent to the letters "r" and "w" and the number "4," but not the letter "y." As a result, with a conventional grid-based on-screen keyboard, once the user has completed inputting a first alphanumeric character, the next character to be entered can be located in any of several directions from the current location of the focus indicator. Thus, the user must visually search for the location of the next character to be entered, then move the focus indicator accordingly, which can be time-consuming and frustrating.

Focus indicator 603 visually highlights the input key 601 or floating utility key 610 that is currently in focus, and is therefore selectable by the user. For example, when a particular input key 601 is highlighted by focus indicator 603, a user can input the alphanumeric character that corresponds to the particular input key 601 by pressing a "select" button, a "play" button, or the like, on a user I/O device 452, such as a suitably configured remote control device. In some embodiments, input keys 601 include a number fly-out key 602, that, when selected by a user, causes display of one or more numerical character input keys 620 (as shown in FIG. 6C). In the embodiment illustrated in FIGS. 6A-6C, numerical fly-out key 602 is disposed adjacent to a last alphabet input key 605. In other embodiments, numerical fly-out key 602 is disposed adjacent to a first alphabet input key 606. Furthermore, in some embodiments, numerical fly-out key 602 is disposed at any other suitable location along linear on-screen keyboard 520.

In the embodiment illustrated in FIGS. 6A-6C, focus indicator 603 is depicted as a square surrounding a particular input key 601. Alternatively or additionally, in some embodiments, focus indicator 603 can be depicted as any other shape or area surrounding the particular input key 601 or otherwise visually highlighting the particular input key 601. For example, focus indicator can include one or more visual effects that visually highlight the particular input key 601, such as color, flashing, animation, and the like.

As noted, in some embodiments, number fly-out key 602 enables display of some or all of numerical characters 1, 2, 3, 4, 5, 6, 7, 8, 9, and 0. In some embodiments, when a user brings number fly-out key 602 in focus (i.e., by positioning focus indicator 603 at number fly-out key 602 as shown in FIG. 6B), some or all of numerical character input keys 620 are displayed (as shown in FIG. 6C). Alternatively, in some embodiments, some or all of numerical character input keys 620 are displayed when the user brings number fly-out key 602 in focus and then presses a button selecting number fly-out key 602. In either case, a certain number of numerical character input keys 620 flow onto linear on-screen keyboard 520 and a corresponding number of alphabetic character input keys 630 flow off of linear on-screen keyboard 520, as shown in FIG. 6C.

As noted above, linear on-screen keyboard 520 includes one or more floating utility keys 610. As shown in FIGS. 6A-6C, floating utility keys 610 are displayed proximate to an input key 601 that is currently indicated by focus indicator 603. In some embodiments, one or more of floating utility keys 610 correspond to a respective input operation that is determined to be performed with at least a threshold frequency. For example, in some embodiments, a floating utility key 610 corresponds to a specific input operation that is employed by a specific user (or users in general) more frequently than the alphanumeric characters that correspond to input keys 601. In one such embodiment, floating utility keys 610 correspond to activation of one or more of a backspace operation, a delete operation, a space operation, or a caps lock operation, among others. Alternatively or additionally, in some embodiments, one or more of floating utility keys 610 correspond to inputting of a respective special character. In such embodiments, a particular floating utility key 610 may correspond to an individual special character, such as an exclamation point (!), an asterisk (*), a common slash (/), a backslash (\), and the like. Alternatively or additionally, in such embodiments, a particular floating utility key 610 may correspond to activation of a menu or list that includes input keys for each of multiple special characters. Alternatively or additionally, in some embodiments, one or more of floating utility keys 610 is a next likely key to be selected by a user, for example based on previously entered alphanumeric characters.

Alternatively or additionally, in some embodiments, one or more of floating utility keys 610 correspond to a special character that is associated with a language-specific special character, or any other auxiliary special character that is neither a numeric character nor Latin alphabetic character, such as a language-specific special characters. In such embodiments, the language-specific special character may include a Latin alphabetic character and a special language mark. In such embodiments, the floating utility key 610 enables the selection and input of a language-specific special character that corresponds to the Latin alphabetic character that is currently highlighted by focus indicator 603. In such embodiments, the floating utility key 610 corresponding to the language-specific special character may be displayed at certain times and not displayed at other times, depending on the location of focus indicator 603. One such embodiment is illustrated in FIG. 7.

Figure 7:
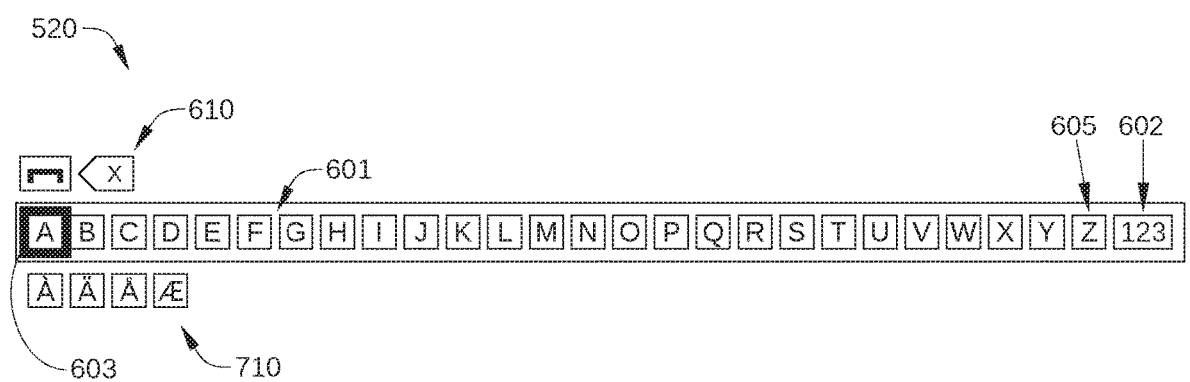
FIG. 7 schematically illustrates linear on-screen keyboard of FIG. 5, according to various embodiments.

FIG. 7 schematically illustrates linear on-screen keyboard 520 of FIG. 5, according to another embodiment of the present invention. As shown, in addition to floating utility keys 610, linear on-screen keyboard 520 further includes one or more language-specific special characters 710 that are displayed proximate to focus indicator 603. In the embodiment illustrated in FIG. 7, focus indicator 603 is disposed proximate to the Latin letter "A." In response, language-specific special characters 710 "À," "Á," "Ä," and "Æ" are displayed and available for selection. Thus, via a user I/O device 452, a user can select "À" by pressing a "down" button and then a "select" button, "Ä" by pressing a "down" button, then a "right" button, then a "select" button, and so on. In some embodiments, language-specific special characters 710 can be limited to special characters associated with a specific predetermined language, such as a language indicated by a user preference.

In some embodiments, linear on-screen keyboard 520 does not include number fly-out key 602. Instead, one or more of numerical character input keys 620 may not be displayed until focus indicator 603 has been positioned proximate to an end of linear on-screen keyboard 520 at which numerical character input keys 620 are located. One such embodiment is illustrated in FIG. 8.

Figure 8:
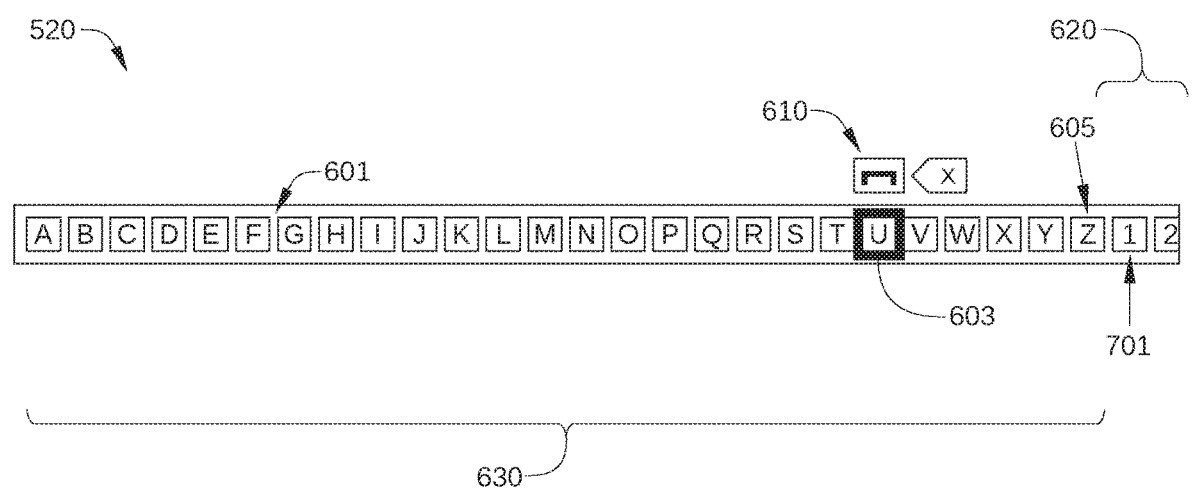
FIG. 8 schematically illustrates linear on-screen keyboard of FIG. 5, according to various embodiments.

FIG. 8 schematically illustrates linear on-screen keyboard 520 of FIG. 5, according to another embodiment of the present invention. As shown, in lieu of displaying some or all of numerical character input keys 620 when a number fly-out key is highlighted or selected, numerical character input keys 620 flow onto linear on-screen keyboard 520 when focus indicator 603 highlights last alphabet input key 605 or a first numerical character input key 701. A corresponding number of alphabetic character input keys 630 flow off linear on-screen keyboard 520 or otherwise stop being displayed.

In the embodiments illustrated in FIGS. 6A-6C, linear on-screen keyboard 520 is configured as a horizontal array of input keys 601, and floating utility keys 610 are displayed on one side of (e.g., above) linear on-screen keyboard 520. In other embodiments, one or more floating utility keys 610 are also displayed on an opposite side of (e.g., below) linear on-screen keyboard 520. One such embodiment is illustrated in FIG. 9.

Figure 9:
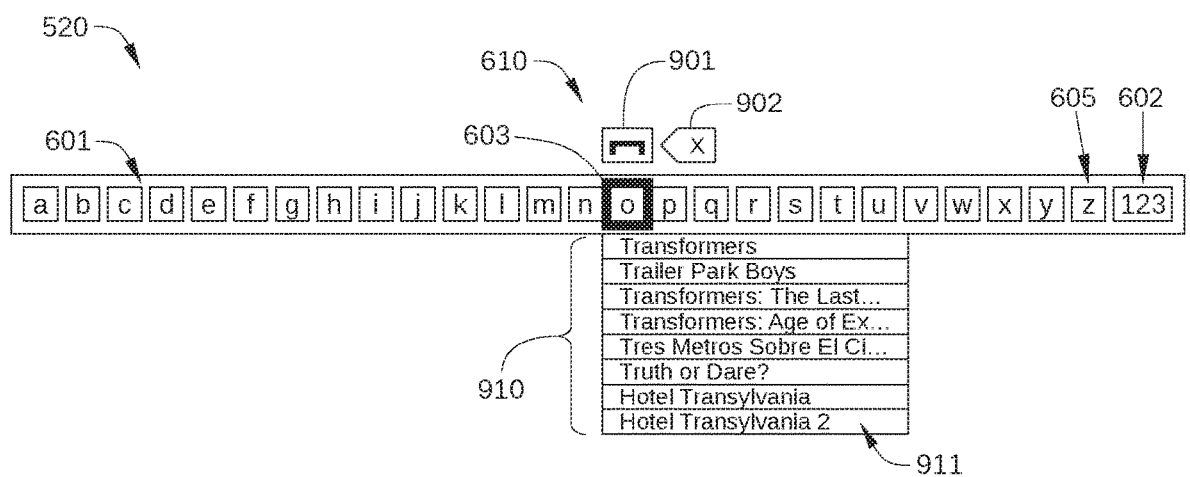
FIG. 9 schematically illustrates linear on-screen keyboard of FIG. 5, according to various embodiments.

FIG. 9 schematically illustrates linear on-screen keyboard 520 of FIG. 5, according to a different embodiment of the present invention. As shown, linear on-screen keyboard 520 includes one or more floating utility keys 610, such as a space key 901 and a backspace key 902, displayed on a first side of linear on-screen keyboard 520. In addition, linear on-screen keyboard 520 includes one or more floating utility keys 910 displayed on a second side of linear on-screen keyboard 520 that is opposite to the first side. In some embodiments, floating utility keys 910 can include input keys that are similar to floating utility keys 610, such as input keys for activating a special operation (delete, insert, etc.), inputting a special character, inputting a language-specific special character, and the like. In the embodiment depicted in FIG. 9, linear on-screen keyboard 520 is associated with a searching function GUI for an online video-streaming service, and floating utility keys 910 include search terms 911 related to a current search query being performed by the user via the GUI. For example, search terms 911 can mirror the information included in text results display region 540 of GUI 500 (see FIG. 5). Alternatively, floating utility keys 910 can present search terms 911 in lieu of text results display region 540 of GUI 500.

In some embodiments, multiple fly-out buttons can be included in linear on-screen keyboard 520. One such embodiment is illustrated in FIG. 10.

Figure 10:
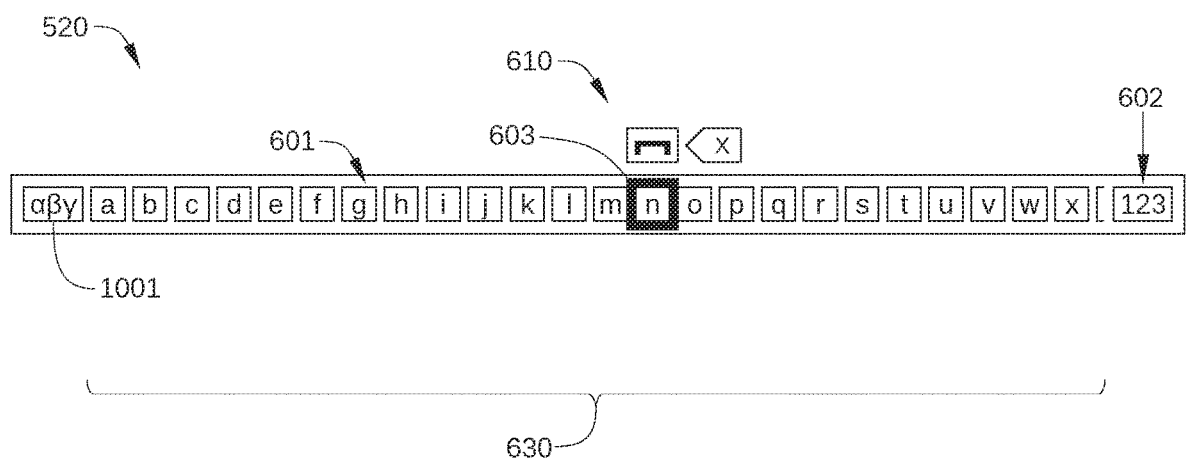
FIG. 10 schematically illustrates linear on-screen keyboard of FIG. 5, according to various embodiments.

FIG. 10 schematically illustrates linear on-screen keyboard 520 of FIG. 5, according to a different embodiment of the present invention. As shown, number fly-out key 602 is disposed on one end of linear on-screen keyboard 520. In addition, linear on-screen keyboard 520 includes a second fly-out key 1001 disposed on an opposite end of linear on-screen keyboard 520. In the embodiment illustrated in FIG. 10, second fly-out key 1001 is configured to enable display of a plurality of input keys for the alphabetic characters of a specific second language, for example Greek. In other embodiments, second fly-out key 1001 is configured to enable display of a plurality of input keys for any other suitable group of alphabetic characters, special characters, mathematical operators, or other auxiliary characters.

In some embodiments, selection of second fly-out key 1001 causes a plurality of new input keys to flow onto linear on-screen keyboard 520 and a corresponding number of Latin alphabet characters to flow off of linear on-screen keyboard 520. In other embodiments, second fly-out key 1001 is configured as a toggle key that enables switching between alphabetic character input keys 630 and the group of keys associated with second fly-out key 1001. In such embodiments, selection of second fly-out key 1001 causes alphabetic character input keys 630 to be replaced in linear on-screen keyboard 520 with the group of keys associated with second fly-out key 1001.

In the embodiments described above, linear on-screen keyboard 520 is depicted as a horizontal array of input keys 601, and bidirectional navigation thereon is in the leftward and rightward directions. In other embodiments, linear on-screen keyboard 520 can be oriented vertically, and bidirectional navigation thereon is in the upward and downward directions. In such embodiments, focus indicator 603 is navigated to floating utility keys 610 when the user inputs at least one leftward or rightward input.

Figure 11:
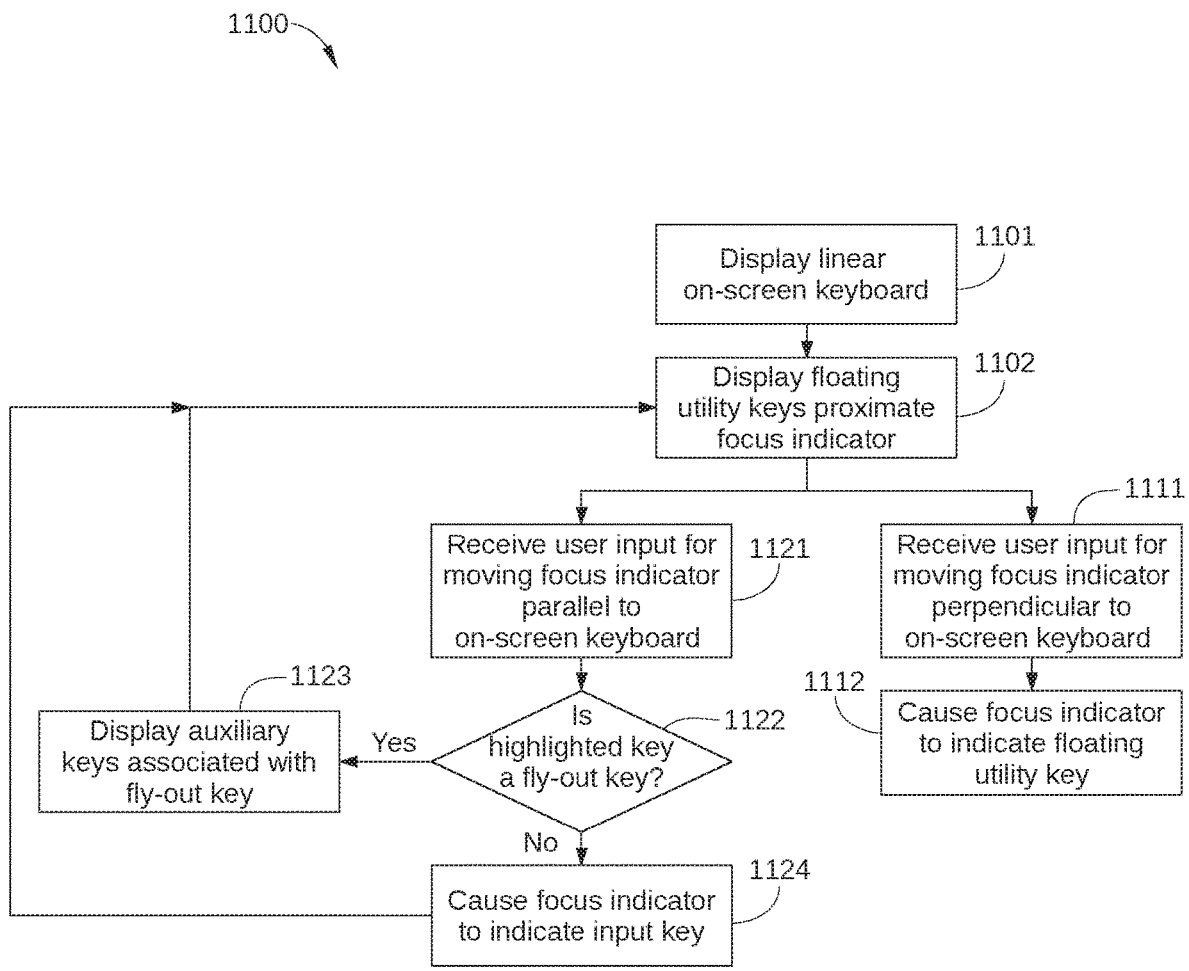
FIG. 11 sets forth a flowchart of method steps for generating a GUI, according to various embodiments.

FIG. 11 sets forth a flowchart of method steps for generating a GUI, according to various embodiments. Although the method steps are described with respect to the systems of FIGS. 1-10, persons skilled in the art will understand that any system configured to perform the method steps, in any order, falls within the scope of the present invention.

As shown, a method 1100 begins at step 1101, in which interface engine 434 of endpoint device 115 causes linear on-screen keyboard 520 to be displayed. Interface engine 434 may perform step 1101 in various instances. For example, when a user of endpoint device 115 inputs a request to playback application 436 to perform a search query, interface engine 434 causes linear on-screen keyboard 520 to be displayed to enable the user to make alphanumeric inputs as part of such a search query. As noted above, interface engine 434 causes an array of input keys 601 to be displayed that each enables the selection of a different respective character via bidirectional navigation with focus indicator 603.

In step 1102, interface engine 434 causes one or more floating utility keys 610 to be displayed proximate to an input key 601 that is currently indicated by focus indicator 603. In some embodiments, interface engine 434 causes the one or more floating utility keys 610 to be displayed in a first location, and interface engine 434 causes input key 601 that is currently indicated by focus indicator 603 to be displayed in a second location, where the first location is displaced from the second location in a first direction that is perpendicular to a second direction that corresponds to the bi-directional navigation of the focus indicator. For example, when linear on-screen keyboard 520 is configured for bidirectional navigation with focus indicator 603 in the horizontal direction, the first location is displaced vertically from the second location. In some embodiments, step 1102 is performed simultaneously with step 1101.

In step 1111, interface engine 434 receives a user input indicating moving focus indicator 603 in the first direction, i.e., perpendicular to linear on-screen keyboard 520. For example, a user presses an "up" or "down" button on a user I/O device 452, such as a suitably configured remote control device while GUI 500 is being displayed.

In step 1112, interface engine 434 causes focus indicator 603 to indicate one of the one or more floating utility keys 610. In some embodiments, linear on-screen keyboard 520 includes multiple floating utility keys 610. In such embodiments, subsequent receipt of certain user navigation inputs (e.g., "select," "left," and/or "right") can cause a suitable input corresponding to one of floating utility keys 610 to be received by interface engine 434 and implemented by playback application 436.

In step 1121, interface engine 434 receives a user input indicating moving focus indicator 603 in the second direction, i.e., along linear on-screen keyboard 520.

In step 1122, interface engine 434 determines whether the input key 601 that is currently indicated by focus indicator 603 is an auxiliary character fly-out key. If yes, method 1100 proceeds to step 1123; if no, method 1100 proceeds to step 1124.

In step 1123, in response to an auxiliary character fly-out key being highlighted by focus indicator 603, interface engine 434 causes a plurality of auxiliary character keys to be displayed as part of linear on-screen keyboard 520. Each of the plurality of auxiliary character keys enables selection of a different respective auxiliary character via bi-directional navigation with focus indicator 603. In some embodiments, interface engine 434 also causes a corresponding number of input keys 601 to flow off linear on-screen keyboard 520 or otherwise stop being displayed. In some embodiments, step 1123 is not performed until the auxiliary character fly-out key is actively selected by the user.

In step 1124, in response to an input key 601 being highlighted by focus indicator 603, interface engine 434 causes focus indicator to indicate the input key 601. Selection of the input key by the user, for example by pressing a "select" button on a suitable user I/O device 452, results in interface engine 434 receiving as an input the corresponding alphanumeric character.

It is noted that method 1100 is a simplified description of the interactions taking place between endpoint device 115, interface engine 434, user I/O device 452, playback application 436, and content server 110. One of skill in the art will readily understand that additional communications may occur between endpoint device 115 and content server 110 for implementing search functions and other interactions between a user and interface engine 434, such as entering user data via GUI 500, modifying account settings via GUI 500, and the like.

In sum, various embodiments set forth systems and techniques for generating a GUI for a television-based display system. In the embodiments, a linear on-screen keyboard is presented to a user that enables selection of alphanumeric characters via bi-directional navigation with a focus indicator along the linear on-screen keyboard. In addition, one or more high-usage utility keys, such as the space input key and/or the backspace input key, are displayed proximate to the current location of the focus indicator for easy access. By contrast, in conventional on-screen keyboards, high-usage utility keys are disposed in a fixed on the keyboard, resulting in frequent navigation back and forth across the keyboard by the user when generating alphanumeric inputs.

At least one technological improvement of the disclosed embodiments is that a user can more quickly and easily enter alphanumeric inputs via a television-based display system compared to conventional on-screen keyboards. In addition, one or more high-usage utility keys can be accessed with a few button presses, regardless of the current location of the focus indicator along the linear on-screen keyboard.

1. In some embodiments, a computer-implemented method comprises: causing a linear on-screen keyboard that includes an array of input keys and a focus indicator to be displayed, wherein navigation of the focus indicator to an input key in the array enables a selection of a character corresponding to the input key; and upon determining that the focus indicator has navigated to a first input key in the array, causing one or more utility keys to be displayed proximate to the first input key.

2. The computer-implemented method of clause 1, wherein at least one of the one or more utility keys comprises a special character input key.

3. The computer-implemented method of clauses 1 or 2, wherein the special character input key is associated with a first language, and wherein the first language is determined based on one of a current location of a computing device causing the linear on-screen keyboard to be displayed, a preferred language setting associated with the computing device, and an input key selection history associated with the computing device.

4. The computer-implemented method of any of clauses 1-3, wherein causing the one or more utility keys to be displayed proximate to the first input key comprises causing the one or more utility keys to be displayed in a first location and the first input key to be displayed in a second location, wherein the first location is displaced from the second location in a first direction that is perpendicular to a second direction in which the focus indicator is configured to navigate over the array of input keys.

5. The computer-implemented method of any of clauses 1-4, further comprising: receiving a user input for navigating the focus indicator in the first direction to a first utility key; and in response, causing the focus indicator to visually highlight the first utility key.

6. The computer-implemented method of any of clauses 1-5, further comprising: receiving a user input for navigating the focus indicator in the second direction from the first input key to a second input key in the array of input keys; and in response, causing the focus indicator to visually highlight the second input key.

7. The computer-implemented method of any of clauses 1-6, further comprising: determining that the first input key comprises an auxiliary character fly-out key; and causing a plurality of auxiliary character keys to be displayed in the linear on-screen keyboard, wherein each of the plurality of auxiliary character keys enables a selection of a different respective auxiliary character via navigation of the focus indicator.

8. The computer-implemented method of any of clauses 1-7, wherein causing the plurality of auxiliary character keys to be displayed comprises, for each of the auxiliary characters, displacing one of the input keys in the array.

9. In some embodiments, a non-transitory computer-readable storage medium includes instructions that, when executed by one or more processors, configure the one or more processors to perform the steps of: causing a linear on-screen keyboard that includes an array of input keys and a focus indicator to be displayed, wherein navigation of the focus indicator to an input key in the array enables a selection of a character corresponding to the input key; and upon determining that the focus indicator has navigated to a first input key in the array, causing one or more utility keys to be displayed proximate to the first input key.

10. The non-transitory computer-readable storage medium of clause 9, wherein each of the one or more utility keys corresponds to a respective input operation that is performed with at least a threshold frequency.

11. The non-transitory computer-readable storage medium of clauses 9 or 10, wherein at least one of the respective input operations comprises one of a backspace operation, a delete operation, and a space operation.

12. The non-transitory computer-readable storage medium of any of clauses 9-11, wherein at least one of the one or more utility keys comprises a special character input key.

13. The non-transitory computer-readable storage medium of any of clauses 9-12, wherein the special character input key is associated with a first language, and wherein the first language is determined based on one of a current location of a computing device causing the linear on-screen keyboard to be displayed, a preferred language setting associated with the computing device, and an input key selection history associated with the computing device.

14. The non-transitory computer-readable storage medium of any of clauses 9-13, wherein causing the one or more utility keys to be displayed proximate to the first input key comprises causing the one or more utility keys to be displayed in a first location and the first input key to be displayed in a second location, wherein the first location is displaced from the second location in a first direction that is perpendicular to a second direction in which the focus indicator is configured to navigate over the array of input keys.

15. The non-transitory computer-readable storage medium of any of clauses 9-14, further comprising: receiving a user input for navigating the focus indicator in the first direction to a first utility key; and in response, causing the focus indicator to visually highlight the first utility key.

16. The non-transitory computer-readable storage medium of any of clauses 9-15, further comprising: receiving a user input for navigating the focus indicator in the second direction from the first input key to a second input key in the array of input keys; and in response, causing the focus indicator to visually highlight the second input key.

17. The non-transitory computer-readable storage medium of any of clauses 9-16, further comprising: determining that the first input key comprises an auxiliary character fly-out key; and causing a plurality of auxiliary character keys to be displayed in the linear on-screen keyboard, wherein each of the plurality of auxiliary character keys enables a selection of a different respective auxiliary character via navigation of the focus indicator.

18. In some embodiments, a system, comprising: a memory that stores instructions; and a processor that is coupled to the memory and, when executing the instructions, is configured to: cause a linear on-screen keyboard that includes an array of input keys and a focus indicator to be displayed, wherein navigation of the focus indicator to an input key in the array enables a selection of a character corresponding to the input key; and upon determining that the focus indicator has navigated to a first input key in the array, cause one or more utility keys to be displayed proximate to the first input key.

19. The computer-implemented method of clause 18, wherein the processor is configured to cause one or more utility keys to be displayed proximate to the first input key by a television-based display system.

20. The computer-implemented method of clauses 18 or 19, wherein the processor is configured to cause the linear on-screen keyboard to be displayed in response to a receiving an input from a remote control of the television-based display system.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
   causing a linear on-screen keyboard that includes an array of input keys and a focus indicator to be displayed, wherein each input key included in a plurality of input keys in the array corresponds to a different single character, and navigation of the focus indicator to an input key in the array enables a selection of a single character corresponding to the input key;
   upon determining that the focus indicator has navigated to a first input key in the array;
      causing a first plurality of utility keys not included in the linear on-screen keyboard to be displayed in a first location proximate to the linear on-screen keyboard, wherein navigation of the focus indicator to each utility key included in the first plurality of utility keys enables a selection of a character corresponding to the utility key that is different from the single character corresponding to the first input key;
      determining that the first input key comprises an auxiliary character fly-out key; and
      causing a plurality of auxiliary character keys to be displayed in the linear on-screen keyboard, wherein each of the plurality of auxiliary character keys enables a selection of a different respective auxiliary character via navigation of the focus indicator; and
   upon determining that the focus indicator has navigated to a second input key in the array, causing one or more second utility keys to be displayed in a second location proximate to the linear on-screen keyboard, wherein the second location is different from the first location, and wherein navigation of the focus indicator to each utility key included in the one or more second utility keys enables a selection of a character corresponding to the utility key that is different from the single character corresponding to the second input key.

2. The computer-implemented method of claim 1, wherein at least one utility key included in the first plurality of utility keys or the one or more second utility keys comprises a special character input key.

3. The computer-implemented method of claim 2, wherein the special character input key is associated with a first language, and wherein the first language is determined based on one of a current location of a computing device causing the linear on-screen keyboard to be displayed, a preferred language setting associated with the computing device, and an input key selection history associated with the computing device.

4. The computer-implemented method of claim 1, wherein causing the first plurality of utility keys to be displayed proximate to the linear on-screen keyboard comprises causing the first plurality of utility keys to be displayed at the first location and the first input key to be displayed in a third location, wherein the first location is displaced from the third location in a first direction that is perpendicular to a second direction in which the focus indicator is configured to navigate over the array of input keys.

5. The computer-implemented method of claim 4, further comprising:
   receiving a user input for navigating the focus indicator in the first direction to a first utility key; and
   in response, causing the focus indicator to visually highlight the first utility key.

6. The computer-implemented method of claim 5, further comprising:
   receiving a user input for navigating the focus indicator in the second direction from the first input key to the second input key in the array of input keys; and
   in response, causing the focus indicator to visually highlight the second input key.

7. The computer-implemented method of claim 1, wherein causing the plurality of auxiliary character keys to be displayed comprises, for each of the auxiliary characters, displacing one of the input keys in the array.

8. A non-transitory computer-readable storage medium including instructions that, when executed by one or more processors, configure the one or more processors to perform the steps of:
   causing a linear on-screen keyboard that includes an array of input keys and a focus indicator to be displayed, wherein each input key included in a plurality of input keys in the array corresponds to a different single character, and navigation of the focus indicator to an input key in the array enables a selection of a single character corresponding to the input key;
   upon determining that the focus indicator has navigated to a first input key in the array;
      causing a first plurality of utility keys not included in the linear on-screen keyboard to be displayed in a first location proximate to the linear on-screen keyboard, wherein navigation of the focus indicator to each utility key included in the first plurality of utility keys enables a selection of a character corresponding to the utility key that is different from the single character corresponding to the first input key;

determining that the first input key comprises an auxiliary character fly-out key; and causing a plurality of auxiliary character keys to be displayed in the linear on-screen keyboard, wherein each of the plurality of auxiliary character keys enables a selection of a different respective auxiliary character via navigation of the focus indicator; and upon determining that the focus indicator has navigated to a second input key in the array, causing one or more second utility keys to be displayed in a second location proximate to the linear on-screen keyboard, wherein the second location is different from the first location, and wherein navigation of the focus indicator to each utility key included in the one or more second utility keys enables a selection of a character corresponding to the utility key that is different from the single character corresponding to the second input key.

9. The non-transitory computer-readable storage medium of claim 8, wherein displaying at least one of the first plurality of utility keys or the one or more second utility keys further includes displaying one or more additional utility keys, wherein each additional utility key corresponds to a respective input operation that is performed with a frequency greater than frequencies corresponding to one or more input keys of the array.

10. The non-transitory computer-readable storage medium of claim 9, wherein at least one of the respective input operations comprises one of a backspace operation, a delete operation, and a space operation.

11. The non-transitory computer-readable storage medium of claim 8, wherein at least one utility key included in the first plurality of utility keys or the one or more second utility keys comprises a special character input key.

12. The non-transitory computer-readable storage medium of claim 11, wherein the special character input key is associated with a first language, and wherein the first language is determined based on one of a current location of a computing device causing the linear on-screen keyboard to be displayed, a preferred language setting associated with the computing device, and an input key selection history associated with the computing device.

13. The non-transitory computer-readable storage medium of claim 8, wherein causing the first plurality of utility keys to be displayed proximate to the linear on-screen keyboard comprises causing the first plurality of utility keys to be displayed at the first location and the first input key to be displayed in a third location, wherein the first location is displaced from the third location in a first direction that is perpendicular to a second direction in which the focus indicator is configured to navigate over the array of input keys.

14. The non-transitory computer-readable storage medium of claim 13, further comprising:

receiving a user input for navigating the focus indicator in the first direction to a first utility key; and in response, causing the focus indicator to visually highlight the first utility key.

15. The non-transitory computer-readable storage medium of claim 14, further comprising:

receiving a user input for navigating the focus indicator in the second direction from the first input key to the second input key in the array of input keys; and in response, causing the focus indicator to visually highlight the second input key.

16. A system, comprising:

a memory that stores instructions; and a processor that is coupled to the memory and, when executing the instructions, is configured to:

cause a linear on-screen keyboard that includes an array of input keys and a focus indicator to be displayed, wherein each input key included in a plurality of input keys in the array corresponds to a different single character, and navigation of the focus indicator to an input key in the array enables a selection of a single character corresponding to the input key;

upon determining that the focus indicator has navigated to a first input key in the array;

cause a first plurality of utility keys not included in the linear on-screen keyboard to be displayed in a first location proximate to the linear on-screen keyboard, wherein navigation of the focus indicator to each utility key included in the first plurality of utility keys enables a selection of a character corresponding to the utility key that is different from the single character corresponding to the first input key;

determine that the first input key comprises an auxiliary character fly-out key; and cause a plurality of auxiliary character keys to be displayed in the linear on-screen keyboard, wherein each of the plurality of auxiliary character keys enables a selection of a different respective auxiliary character via navigation of the focus indicator; and upon determining that the focus indicator has navigated to a second input key in the array, cause one or more second utility keys to be displayed in a second location proximate to the linear on-screen keyboard, wherein the second location is different from the first location, and wherein navigation of the focus indicator to each utility key included in the one or more second utility keys enables a selection of a character corresponding to the utility key that is different from the single character corresponding to the second input key.

17. The computer-implemented method of claim 16, wherein the processor is configured to cause the first plurality of utility keys to be displayed proximate to the linear on-screen keyboard by a television-based display system.

18. The computer-implemented method of claim 17, wherein the processor is configured to cause the linear on-screen keyboard to be displayed in response to receiving an input from a remote control of the television-based display system.

* * * * *